(12) United States Patent
Bakke et al.

(10) Patent No.: US 9,607,007 B2
(45) Date of Patent: Mar. 28, 2017

(54) PROCESSING OF GEOLOGICAL DATA (75) Inventors: Jan Oystein Haavig Bakke, Stavanger (NO); Geir Vaaland Dahl, Stavanger (NO); Hallgrim Ludvigsen, Stavanger (NO); Erik Monsen, Stavanger (NO); Oddgeir Gramstad, Algard (NO); Michael Nickel, Stavanger (NO); Lars Sonneland, Tananger (NO); Marcelo Belentani De Bianchi, Potsdam (DE)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1217 days.

(21) Appl. No.: 13/518,547

(22) PCT Filed: Dec. 3, 2010

(86) PCT No.: PCT/IB2010/055574
§ 371 (c)(1),
(2), (4) Date: Mar. 7, 2013

(87) PCT Pub. No.: WO2011/077300
PCT Pub. Date: Jun. 30, 2011

(65) Prior Publication Data
US 2013/0158877 A1  Jun. 20, 2013

Related U.S. Application Data (60) Provisional application No. 61/289,593, filed on Dec. 23, 2009, provisional application No. 61/353,880, filed on Jun. 11, 2010.

(51) Int. Cl.
G06F 17/30 (2006.01)
E21B 49/00 (2006.01)
(Continued)

(52) U.S. Cl.
CPC ........ *G06F 17/30241* (2013.01); *E21B 49/00* (2013.01); *G01V 1/30* (2013.01); *G01V 11/00* (2013.01)

(58) Field of Classification Search
CPC .... G01V 11/00; G01V 1/30; G06F 17/30241; E21B 49/00
(Continued)

(56) References Cited

U.S. PATENT DOCUMENTS 5,226,019 A  7/1993  Bahorich
5,724,309 A  3/1998  Higgs et al.
(Continued)

FOREIGN PATENT DOCUMENTS

| CA | 2659925 C | * 6/2015 | ............. G01V 99/00 |
| WO | 9837437 A1 | 8/1998 | |

(Continued)

OTHER PUBLICATIONS

Randen, et al., "Atlas of 3D seismic Attributes", Chapter 2 of Mathematical Methods and Modelling in Hydrocarbon Exploration and Production, ed., Springer, Verlin Heidelberg, 2005, pp. 23-46.
(Continued)

Primary Examiner — Carol S Tsai
(74) Attorney, Agent, or Firm — Joan Beckner (57) ABSTRACT

A method of processing data points distributed throughout a geological volume is described. In the method, each data point is associated with respective geological attributes. The method provides for: coding the geological attributes of each data point as a respective character string; compiling a query character string defining sought geological attributes of an arrangement of one or more data points; searching the coded geological attributes for arrangements of data points having geological attributes matching the query character string; and identifying matched data points.

16 Claims, 9 Drawing Sheets

(51) Int. Cl.
  *G01V 1/30* (2006.01)
  *G01V 11/00* (2006.01)
(58) Field of Classification Search
  USPC .................. 702/14; 324/339; 455/456.1
  See application file for complete search history.

(56) References Cited

U.S. PATENT DOCUMENTS

| | | | |
|---|---|---|---|
| 6,092,074 A | 7/2000 | Rodkin et al. | |
| 6,480,230 B1* | 11/2002 | Honma | H04N 5/23293 345/603 |
| 6,819,111 B2* | 11/2004 | Fanini | G01V 3/28 175/45 |
| 6,915,310 B2 | 7/2005 | Gutierrez et al. | |
| 7,003,439 B2 | 2/2006 | Aldred et al. | |
| 7,184,991 B1 | 2/2007 | Wentland et al. | |
| 7,203,342 B2 | 4/2007 | Pedersen | |
| 7,248,539 B2 | 7/2007 | Borgos et al. | |
| 7,426,331 B2* | 9/2008 | Faisy | H04N 5/782 386/291 |
| 7,606,581 B2* | 10/2009 | Riise | G06F 17/30241 455/446 |
| 7,606,582 B2* | 10/2009 | Riise | G06Q 30/02 455/456.1 |
| 7,616,964 B2* | 11/2009 | Riise | G06F 17/30241 455/432.3 |
| 7,848,764 B2* | 12/2010 | Riise | G06F 17/30241 455/446 |
| 7,853,270 B2* | 12/2010 | Riise | G06F 17/30241 340/540 |
| 8,050,689 B2* | 11/2011 | Riise | G06F 17/30241 382/113 |
| 8,743,115 B1* | 6/2014 | Mallet | G01V 1/302 345/419 |
| 2002/0126896 A1 | 9/2002 | Pedersen | |
| 2003/0112704 A1 | 6/2003 | Goff et al. | |
| 2004/0100263 A1* | 5/2004 | Fanini | G01V 3/28 324/339 |
| 2004/0260476 A1 | 12/2004 | Borgos et al. | |
| 2005/0120013 A1* | 6/2005 | Chang | G06F 17/30241 |
| 2007/0135991 A1* | 6/2007 | Riise | G06F 17/30241 455/456.1 |
| 2007/0135993 A1* | 6/2007 | Riise | G06Q 30/02 455/456.1 |
| 2007/0146374 A1* | 6/2007 | Riise | G06F 17/30241 345/505 |
| 2007/0150199 A1* | 6/2007 | Riise | G06F 17/30241 702/5 |
| 2008/0285384 A1 | 11/2008 | James | |
| 2009/0119255 A1* | 5/2009 | Frank | G06F 17/3087 |
| 2010/0029299 A1* | 2/2010 | Riise | G06Q 30/02 455/456.1 |
| 2010/0030646 A1* | 2/2010 | Riise | G06F 17/30241 705/14.58 |
| 2010/0161232 A1 | 6/2010 | Chen et al. | |
| 2014/0341345 A1* | 11/2014 | Morton | G01V 5/0041 378/57 |

FOREIGN PATENT DOCUMENTS

| | | |
|---|---|---|
| WO | 2008/086352 | 7/2008 |
| WO | 2008086352 A1 | 7/2008 |
| WO | 2011/149609 | 12/2011 |
| WO | 2013/108221 | 7/2013 |

OTHER PUBLICATIONS

International Search Report issued in PCT/IB2010/055574 on Aug. 31, 2011; 3 pages.
T. Randen, et al, "Three-Demensional Texture Attribute for Seismic Data Analysis," Expanded Abstract Int. Mtg., Society of Explorational Geophysicists, 2000.
Combined search and examination report for the relevant GB patent application No. 1200773.8 issued on Apr. 24, 2012.
International search report for the relevant PCT patent application No. PCT/IB2013/050473 issued on Jun. 26, 2013.

\* cited by examiner

PROCESSING OF GEOLOGICAL DATA

REFERENCE TO PRIOR APPLICATIONS

This application claims the benefit of U.S. Provisional Application No. 61/289,593, filed Dec. 23, 2009, and U.S. Provisional Application No. 61/353,880, filed Jun. 11, 2010, the entireties of which are incorporated herein by reference.

FIELD OF THE INVENTION

The present invention relates to a method of processing data, such as seismic data, distributed throughout a geological volume. In particular, but not by way of limitation, the present invention relates to a method for targeting drilling locations by processing geological data distributed throughout a geological volume.

BACKGROUND OF THE INVENTION

The characterisation of subsurface strata is important for identifying, accessing and managing reservoirs. The depths and orientations of such strata can be determined, for example, by seismic surveying. This is generally performed by imparting energy to the earth at one or more source locations, for example, by way of controlled explosion, mechanical input etc. Return energy is then measured at surface receiver locations at varying distances and azimuths from the source location. The travel time of energy from source to receiver, via reflections and refractions from interfaces of subsurface strata, indicates the depth and orientation of the strata.

U.S. Pat. No. 7,248,539 discloses a method for automated extraction of surface primitives from seismic data. For example, one embodiment of the method of U.S. Pat. No. 7,248,539 involves defining, typically with sub-sample precision, positions of seismic horizons through an extrema representation of a 3D seismic input volume; deriving coefficients that represent the shape of the seismic waveform in the vicinity of the extrema positions; sorting the extrema positions into groups that have similar waveform shapes by applying classification techniques with the coefficients as input attributes using unsupervised or supervised classification based on an underlying statistical class model; and extracting surface primitives as surface segments that are both spatially continuous along the extrema of the seismic volume and continuous in class index in the classification volume.

The characterisation of faults and fractures in reservoir formations can also be important. For example, fractures intersecting drilled wells may assist the flow of hydrocarbons from the reservoir and so increase production. Conversely, fractures may allow water to flow into wells and so decrease production.

WO 2008/086352 describes a methodology for mapping fracture networks from seismic data using fracture enhancement attributes and fracture extraction methods. For example, borehole data can be used to determine modes of fracture, and in particular whether fracture clusters or networks would be detectable in surface seismic data. It can also provide information on fracture network inclination (i.e. average inclination of the fractures in a network relative to the horizontal) and strike azimuth (i.e. average direction of intersection of the fractures in a network relative to the horizontal).

Discontinuity extraction software (DES), for example as described in U.S. Pat. No. 7,203,342, may then be utilised to extract 3D volumes of fracture networks from surface seismic data. Extracted fracture networks may be parameterised in terms of the strength of their seismic response, and on their length, height and width.

The approach of U.S. Pat. No. 7,203,342 may also be used to characterise and extract other geological features, such as faults, from seismic data.

SUMMARY OF THE INVENTION

In seismic analysis, a problem arises of identifying relevant information in geological volumes which may contain large amounts of seismic and other geological information.

Accordingly, a first aspect of the present invention provides a method of processing data points distributed throughout a geological volume, each data point being associated with respective geological attributes, the method including the steps of:

coding the geological attributes of each data point as a respective character string;

compiling a query character string defining sought geological attributes of an arrangement of one or more data points;

searching the coded geological attributes for arrangements of data points having geological attributes matching the query character string; and identifying matched data points.

By coding the geological attributes as character strings, large amounts of information can be presented in a format that facilitates fast and efficient searching by the query character string.

The coding step may include concatenating the character strings of the data points into a single search string, the searching step being performed on the search string. This may help, among other things, to promote fast searching by the query character string.

A related second aspect of the invention provides a method of processing data points distributed throughout a geological volume, each data point being associated with respective geological attributes and the geological attributes of each data point being coded as a respective character string (optionally the character strings being concatenated into a single search string), the method including the steps of:

compiling a query character string defining sought geological attributes of an arrangement of one or more data points;

searching the coded geological attributes for arrangements of data points having geological attributes matching the query character string; and identifying matched data points.

The method of the first or second aspect may have any one, or to the extent that they are compatible, any combination of the following optional features.

The geological attributes can be seismic attributes and/or geometric attributes and/or numerical modelling derived attributes. Seismic attributes, however, are generally included in the geological attributes.

Seismic attributes are derived by performing mathematical operations on and/or filtering of seismic data. The seismic attributes are typically selected from the group consisting of: seismic amplitude, seismic higher order derivative, seismic phase, amplitude vs. offset data, chaos, variance, curvature, dip, dip deviation, and fracture enhancement attributes. U.S. Pat. No. 7,248,539 describes some of these attributes in more detail. Seismic attributes are discussed more fully in T. Randen and L. Senneland, "Atlas of 3D Seismic Attributes", chapter 2 of "Mathematical Methods and Modelling in Hydrocarbon Exploration and Production", ed. A. Iske and T. Randen, Springer, Berlin Heidelberg, 2005. Preferably each data point is associated with at least the respective seismic amplitude.

Typically, the arrangement is a line of adjacent data points. For example, the method may have an initial step of analysing the results of seismic testing (e.g. seismic surveying) by identifying seismic extrema (i.e. maxima, minima and/or zero crossings) along spaced lines (typically spaced vertical lines) through the geological volume, the position of each extrema providing the location of a respective data point, and the value of the extrema providing the respective seismic attribute for the data point. Conveniently, the query character string then defines sought seismic attributes along the same lines of data points. Thus the data points can be set up in such a manner to facilitate searching along (typically vertical) lines. On the other hand, it may desirable to compile a query character string defining sought seismic attributes of data points which are e.g. within a specified horizon surface.

Although the data points can be set up to facilitate searching along the lines used to identify seismic extrema, other options for positioning the data points are possible. For example, the data points can correspond to the positions of a regular array (e.g. a primitive cubic lattice). The data points can correspond to the positions of imaging voxels.

The method may further include the step of graphically displaying identified data points. For example, the graphical display may show surface horizons associated with the identified data points.

In addition, the method may further include the step of interpolating data points between identified matched data points. This allows, for example, patches of data points meeting the criteria of the query character string to be combined into larger surfaces. Typically, the method then further includes the step of graphically displaying interpolated data points.

The graphically displayed data points may be displayed as a geobody.

The data may comprise one or more geometric attributes. For example, each data point may be further associated with respective geometric attributes. Thus seismic and geometric attributes of each data point may be coded as a respective character string. The query character string may define sought seismic and/or geometric attributes of the arrangement of one or more data points.

Geometric attributes can be derived from (manually or automated) interpreted geometric primitives from a model repository. The geometric attributes are typically selected from the group consisting of: horizontal position, vertical position, proximity to faults, proximity to fractures, horizon surface dip, fault surface dip, proximity to oil-water-contacts, proximity to oil-gas-contacts, number of neighbouring extrema patches (which is an example of more general geometric attributes such as chaoticness and variance exhibited by local extrema patches), extrema patch area, extrema patch inline extent and extrema patch crossline extent. The geometric attributes can be created automatically or manually from e.g. the seismic testing results, or other data such as surface elevation maps, satellite photographs, and gravity, magnetic and/or electromagnetic survey results.

The data may comprise one or more attributes derived from numerical modelling of the subsurface. Thus each data point may be associated with respective seismic attributes and/or geometric attributes and/or numerical modelling derived attributes. The query character string may define sought seismic and/or geometric and/or numerical modelling derived attributes of the arrangement of one or more data points In an aspect of the present invention, geological attributes (e.g. seismic and/or geometric and/or numerical modelling derived attributes) may be combined in the query character string. In such an aspect, the string may then correspond to known drilling hazard signatures and/or to target drilling signatures. Thus, in one embodiment of the present invention, the search step can effectively be a search for drilling hazards and/or targets. Well trajectories can then be designed which avoid the hazards and/or reach the targets.

The method of the first cr second aspect may further include initial steps of:
performing seismic testing (e.g. seismic surveying); and
analysing results of the seismic testing to generate the data points distributed throughout a geological volume, each data point being associated with respective seismic attributes. For example, the analysis step may be the identification of seismic extrema along spaced lines through the geological volume discussed above. The method may further include an initial step of analysing the results of the seismic testing to generate the geometric attributes. For example, the shapes and positions of surface horizons, faults and fractures can be extracted from the extrema, and these shapes and positions then allow geometric attributes such as curvatures, dips, dip deviations, proximities etc. to be calculated.

In general terms, a third aspect of the present invention also provides a method for avoiding drilling hazards and/or for targeting drilling locations from processing geological data distributed throughout a geological volume.

The third aspect of the present invention provides a method of identifying possible drilling hazards and/or target drilling locations including the steps of:
providing a model repository of the subsurface, the model repository containing interpreted subsurface features having geological attributes (e.g. seismic attributes and/or geometric attributes and/or numerical modelling derived attributes) at respective subsurface positions of the features;
compiling a drilling hazard signature and/or a drilling target signature based on a combination of the geological attributes; and
searching the model repository to identify subsurface positions which have geological attributes matching the drilling hazard signature and/or the drilling target signature. The interpreted subsurface features can typically include horizons, faults, fractures and/or geobodies. These may be manually or automatically interpreted, e.g. from seismic and/or geomechanic data. The model repository can include data defining a geological volume according to the first aspect. The geological attributes (e.g. seismic and/or geometric and/or numerical modelling derived attributes) of each point can then be coded as respective character strings, and the drilling hazard signature and/or the drilling target signature can be in the form of the query character string of the first aspect. However, other forms of model repository combined with other forms of signature can be envisioned. For example, the model repository may include data points distributed throughout a geological volume, each data point being associated with respective geological attributes (e.g. seismic and/ or geometric and/or numerical modelling derived attributes), and the signature can be embodied in a clustering analysis that discriminates between drilling hazard and non-drilling hazard data points, or between drilling target, drilling hazard and non-drilling hazard data points. Alternatively, the signature can be embodied in a neural network trained to perform a supervised classification between drilling hazard and non-drilling hazard data points, or between drilling target, drilling hazard and non-drilling hazard data points. In either case, coding of the attributes of each data point may not be necessary.

The method of the third aspect allows the use of different inputs as for the geological attributes, such as seismic volumes and model primitives. The method can also extend beyond single data point identification, in that the matched signature can encompass a plurality of, typically adjacent and/or related, data points in the model repository. For example, the signature can correspond to a play (i.e. a combination of reservoir, seal, source and trap) or range of similar plays. Advantageously, the method of the invention allows for simple and complex hazard signatures and/or target signatures.

A fourth aspect of the present invention provides a model repository including data points distributed throughout a geological volume, each data point being associated with respective geological attributes and the geological attributes of each data point being coded as a respective character string. For example, the geological attributes can be seismic attributes. The character strings may be concatenated into a single search string. Each data point may additionally or alternatively be associated with respective geometric attributes and/or numerical modelling derived attributes, the seismic and/or geometric and/or numerical modelling derived attributes of each data point being coded as a respective character string.

Thus the model repository can be used in the performance of the method of the second aspect. The model repository may contain interpreted subsurface features, the data points being associated with seismic and geometric attributes at respective subsurface positions of the features. In this case, the model repository can be used in the performance of the method of the third aspect.

The model repository of the third or fourth aspect is typically carried on a computer-readable medium.

A further aspect of the present invention provides a method of controlling a well drilling operation including the steps of:
performing the method of the first, second or third aspect;
using the identified data points of the first or second aspect or the identified subsurface positions of the third aspect to design a well trajectory; and
drilling a well having the designed trajectory. During the drilling, the trajectory may be updated e.g. based on updated geological (e.g. seismic and/or stratigraphic) information.

When performing the method of the first or second aspect in the method of controlling a well drilling operation, preferably the query character string defines sought attributes corresponding to one or more drilling hazard and/or drilling target signatures. The well trajectory is preferably designed to avoid identified drilling hazards and/or to follow target drilling locations.

During the drilling, the trajectory may be updated based on updated geological information, e.g. obtained from measurement-while-drilling (MWD) techniques:

Further aspects of the invention provide (i) a computer system, (ii) a computer program product, e.g. a computer-readable medium, carrying a program, and (iii) a computer program, each of (i) to (iii) being for performing the method of the first, second or third aspect (optionally including any one or, to the extent that they are compatible, any combination of the optional features of the respective aspect). For example, a computer system may have a processor adapted to perform the coding, compiling, searching and identifying steps of the first aspect; the compiling, searching and identifying steps of the second aspect; or the compiling and searching steps of the third aspect.

BRIEF DESCRIPTION OF THE DRAWINGS

Embodiments of the invention will now be described by way of example with reference to the accompanying drawings in which:

FIGS. 4(a) and (b) which shows two closer views of parts of the cross-section of FIG. 3(a);

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention.

Specific details are given in the following description to provide an understanding of the embodiments. However, it will be understood by one of ordinary skill in the art that the embodiments may be practiced without these specific details.

Also, it is noted that the embodiments may be described as a process which is depicted as a flowchart. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "computer-readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The or each device may be portable or fixed.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as computer-readable medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In an example where the geological data would include seismic data, the geological data volume can be treated as being a collection of horizon surfaces (often referred to as seismic events or strata) that are defined at the positions of seismic data zero-crossings, maximum values or minimum values. Known methods by which such a sparse surface representation of a seismic data volume may be obtained are diverse, including manual interpretation, connected component labelling of extrema cubes and extrema classification.

Extrema detection, in particular, is a well known concept in signal and image processing, and there are many algorithms and techniques for performing such detection. For example, applying the extrema classification method discussed in U.S. Pat. No. 7,248,539, it is possible to obtain a sub-sample precision representation of all extrema within a seismic volume using volume reflection spectral decompositions (as discussed in WO 98/37437).

A particular advantage of using the approach of U.S. Pat. No. 7,248,539 for extracting connected horizon surfaces is that it can provide robust and versatile solutions even when faulted or chaotic regions are encountered.

More generally, extrema classification methods for horizon extraction can provide very good characterization of the local signal shape, as well as shape similarity throughout the area of interest.

Fault identification in seismic data can be performed e.g. by using swarm intelligence through the deployment of artificial ants into attribute volumes, as described in U.S. Pat. No. 7,203,342.

Analysis, for example through calculation of seismic attributes, and information from well logs (as described in WO 2008/086352), can also reveal 3D sub-volumes containing fracture networks. In particular, fracture enhancement attributes enhance signals caused by fractures in seismic data.

Having identified sub-volumes of interest, fracture extraction can be performed on the fracture enhancement attributes for each vintage, to obtain a geometrical representation of the fracture networks. Fracture extraction can proceed by identifying discontinuities in the fracture enhancement attribute. One example of a fracture network extraction procedure is again described in U.S. Pat. No. 7,203,342.

In particular, by applying such techniques, it is possible to obtain a geological volume in which data points distributed throughout the volume are associated with respective seismic and geometrical attributes. Typical seismic attributes are seismic amplitudes and phases for the data points. These amplitudes and phases can be, for example, the starting values for the extrema classification method of U.S. Pat. No. 7,248,539. Typical geometric attributes are the horizontal and vertical positions of the respective data points, and the proximity to faults and fractures, as identified, for example, by the approach of U.S. Pat. No. 7,203,342.

Such a geological volume can contain a large amount of information, and a problem then arises of how to identify relevant information within the volume. The present invention addresses this problem by coding the attributes at respective data points as a character string. Conveniently, such strings can provide a compact data format and are easily interrogatable. Further, the strings for all the data points of the volume may be combined into a single search string. Searches for e.g. a single extrema (i.e. surface horizon) or a varying sequence of extrema can then be performed using string searching techniques (implemented in software or hardware) known to the skilled person. This approach to searching allows for a large degree in flexibility in the search expression, and hence in the attributes of arrangements of data points corresponding to that expression. In particular, the query character string syntax can be in the form of a regular expression which is concise but which is nonetheless accommodating in the number of extrema that may be present in the result. The extrema found in such a search can be used to create a geobody, i.e. a well defined volume in the seismic cube, which can then be used for reservoir modelling.

Figure 1:
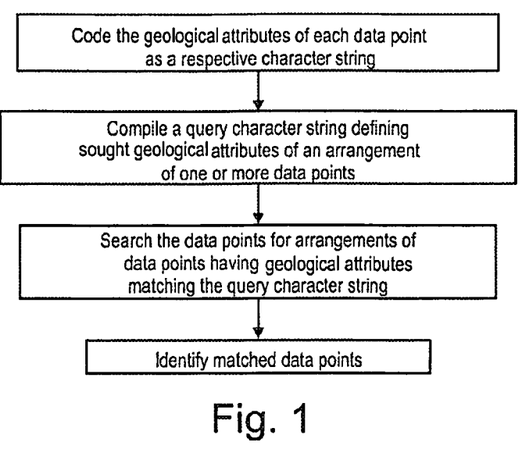
FIG. 1 shows schematically an overview flow chart for the method of the present invention.
Figure 2:
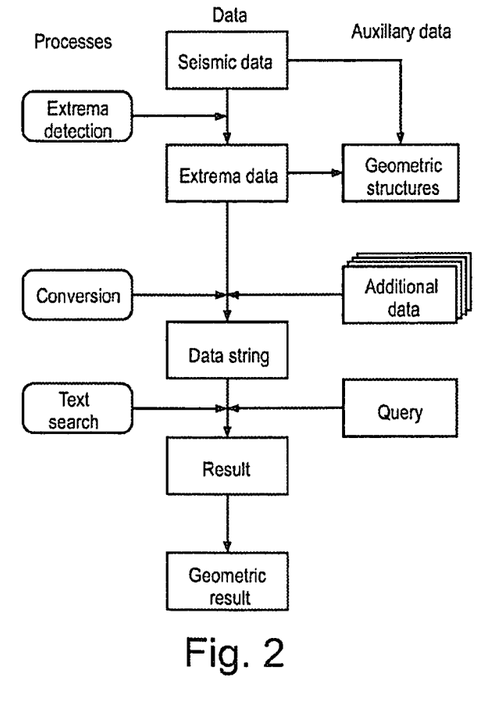
FIG. 2 shows a more detailed flow chart for an embodiment of the invention.

FIG. 1 shows schematically an overview flow chart for a method of the present invention, the method being performed on data points distributed throughout a geological volume with each data point being associated with respective geological (e.g. seismic and/or geometric) attributes. FIG. 2 shows a more detailed flow chart for an embodiment of the invention. From a seismic volume (typically a cube)

it is often desirable to extract geometric structures describing subsurface regions of different rock and/or fluid properties. The boundaries of these structures are created from the changes in seismic signal and/or attributes derived from the seismic. These changes originate from the change of material properties or fluid content when the seismic wave moves across a subsurface interface. The extraction of the geometric structures can be performed in the following steps on the seismic volume:

1. The extrema points (i.e. local minima and maxima in the recorded seismic signal) on each vertical seismic trace are identified. These form the data points for the subsequent steps.
2. At the data points, respective seismic and geometric attributes are collected, such as the waveform attributes from the extrema classification (e.g. amplitude and higher order derivatives), extrema class index (from extrema classification as described in U.S. Pat. No. 7,248,539), curvature attributes, dip, dip deviation, chaos and variance, vertical and horizontal position, proximity to fracture or fault etc.
3. At each data point the numerical attribute values are converted into a character string, called the substring. The substrings for all the data points are then collected and concatenated into on large string, called the search string. During this process the position of the substring in the search string for each data point is recorded and stored together with the corresponding position in the seismic volume. In this way the search results from a search on the search string can be translated into a position in the seismic volume.
4. A query character string is prepared for the search, e.g. manually created by the user, created by software based on point and click input from the user, or selected from a pre-existing database of signatures.
5. The search is performed.
6. The result is post-processed into geometrical structures such as points, patches or geobodies.

At step 2, geometric attributes at the data points can also be derived from structures that have been manually interpreted on the seismic. For example, a seismic horizon may be manually drawn on a seismic cross-section not following the structure of the seismic signal. Again at step 2, geometric attributes at the data points can be derived from non-seismic data, such as surface elevation maps (e.g. to measure elevation over areas with injection of water/gas and subsidence is detected over areas where oil/gas is produced), satellite photographs (e.g. to identify faults that are visible on the surface of the earth), electromagnetic surveying (e.g. to measure subsurface resistivity differences which can be used to detect hydrocarbons, salt etc.), or other geomechanical data.

Table 1 shows how substrings can be created for four vertically successive data points, each data point having two attributes. The two attributes are converted to characters using two different conversion scales. In each scale the range of possible attribute values is divided into a 26 subranges, each subrange being designated by a letter, the letter "a" being at the bottom of the range and the letter "z" at the top. A search string describing the four data points is then a concatenation of the substrings in the sixth column, i.e. "usyzbazk".

TABLE 1

| Extrema number | Attribute 1 | Converted attribute 1 | Attribute 2 | Converted attribute 2 | Extrema substring |
|---|---|---|---|---|---|
| 1 | 1.12 | u | 5.0 | s | us |
| 2 | 1.50 | y | 8.0 | z | yz |
| 3 | −1.40 | b | 1.0 | a | ba |
| 4 | 1.60 | z | 4.0 | k | zk |

Example 1

A first example illustrates how, using this approach, two subsurface reflectors, which are neighbours vertically, can be searched for, while allowing for other reflectors to appear between these two reflectors. The search is over the seismic amplitude of the reflectors.

Figure 3:
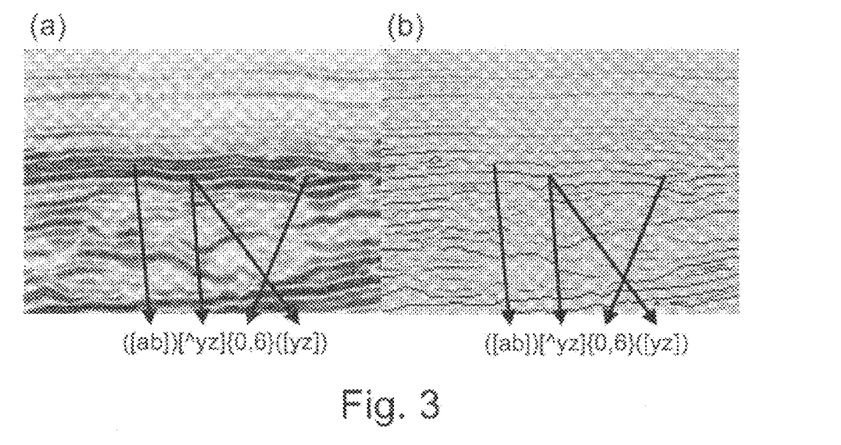
FIG. 3 shows (a) a seismic amplitude cross-section and (b) the corresponding surface horizon cross-section.

In FIG. 3 the query string, ([ab])[^yz]{0,6}([yz]), for the example is shown together with the upper and lower reflectors coloured by their seismic amplitude values. FIG. 3(a) is a seismic amplitude cross-section and FIG. 3(b) is the corresponding surface horizon cross-section. The searching in this example uses regular expressions within Matlab™. The search is for the volume between the two strong reflectors in the middle of FIG. 3. The regular expression query is made up of a part searching for the upper reflector [ab] (i.e. a OR b), a part allowing for up to six reflectors not matching the lower reflector [^yz]{0,6} (i.e. 0 to 6 reflectors, none of which are y OR z), and finally a part searching for the lower reflector [yz] (i.e. y OR z). The parenthesis ( . . . ) signals that the position of the respective match will be returned from the query.

Figure 4:
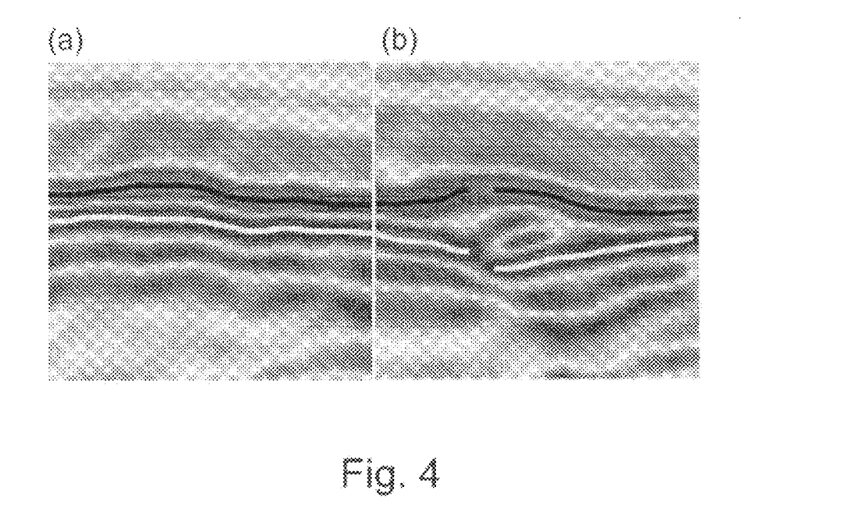

The result from this search is also shown in FIG. 4 which shows two closer views of parts of the cross-section of FIG. 3(a). In FIG. 4(a) there are no additional reflectors between the upper and lower reflectors. In contrast, in FIG. 4(b) the search managed to identify the two reflectors despite a second pair of reflectors which emerged between the upper and lower reflectors. The extracted subvolume is the volume between the lines overlaid in FIG. 4 on the seismics of the upper and lower reflectors.

Example 2

A second example shows how the method can be used to detect more complex structures. The search in this case is for a thin turbidite channel.

Figure 5:
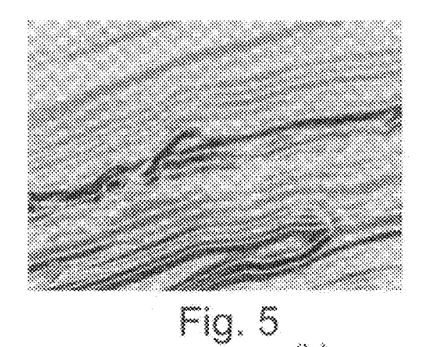
FIG. 5 is a seismic amplitude cross-section through a turbidite channel.

FIG. 5 is a seismic amplitude cross-section through the channel, which runs diagonally upward from left to right from about a third of the way up the left hand side of the cross-section to two thirds of the way up the right hand side of the cross-section. A prior interpretation of the channel (thin line) overlays the seismic data.

The query string in this case, ([e-j])[a-m]{0,3}([s-w]), is for one medium strength negative amplitude upper extrema, and one medium strength positive amplitude lower extrema, allowing for up to three negative amplitude extrema between the upper and lower extrema.

Figure 6:
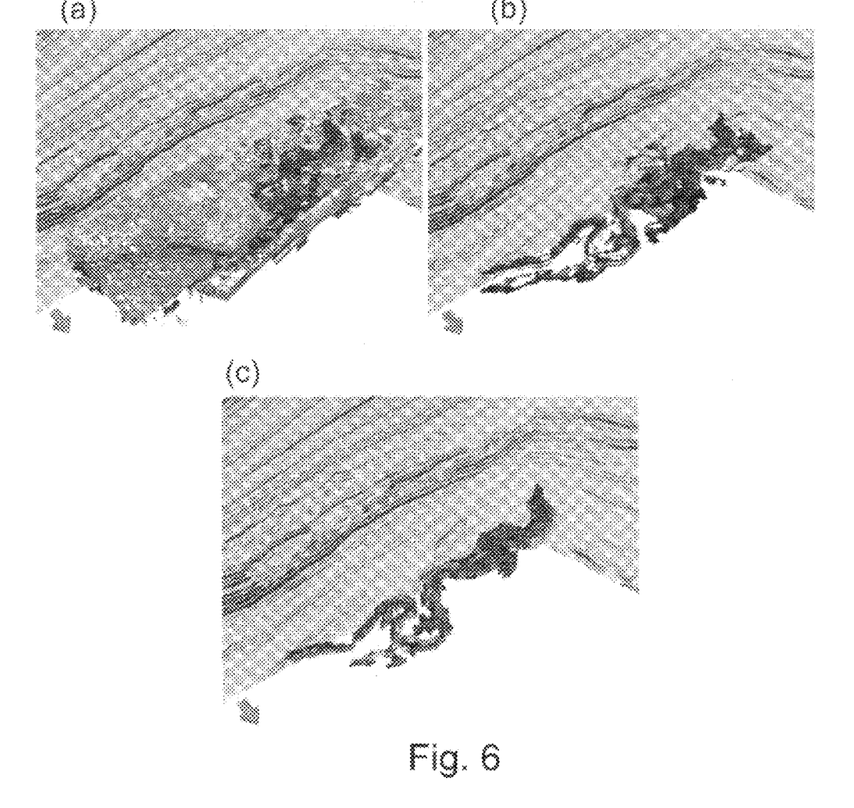
FIG. 6 shows (a) patches corresponding to top and base reflectors of the turbidite channel identified by a query string for the channel, (b) the top and base of the channel manually extracted from the patches, and (c) a final geobody for the channel.

The search identified a number of patches matching the query string. The raw search result is shown in FIG. 6(a). From these patches, the top and base of the channel was manually extracted, as shown in FIG. 6(b). A final geobody, shown in FIG. 6(c), was then created by retaining only those portions of the top and base which were vertically aligned with each other.

Example 3

Figure 7:
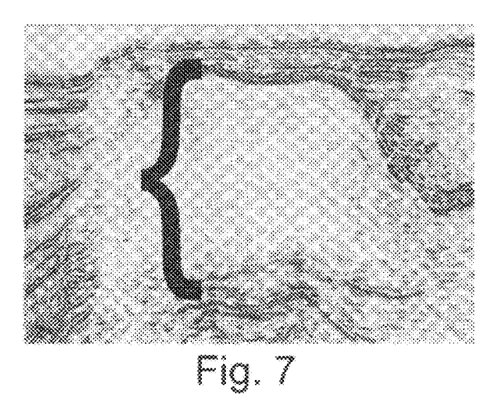
FIG. 7 is a seismic amplitude cross-section through a salt dome.

A third example illustrates how a search can identify the top and base of a salt dome. It also shows how flexible the search can be when it comes to the number of extrema that are included in the query string. FIG. 7 is a seismic amplitude cross-section, the large bracket showing the extent of the salt. It is desired to detect the top and base reflectors of the salt, regardless of how many reflectors (extrema) exist in the salt region.

The Matlab™ query string for this search is:

([t-z])[a-m][d-p]{0,4}[l-o]*([klop])

which allows for an unlimited number of low amplitude extrema. A detailed description of the top and base salt query is given in Table 2.

TABLE 2

| Query part | Description |
| --- | --- |
| ([t-z]) | Matches characters between and including 't' and 'z'. The parenthesis (. . .) signals that the position of this match will be returned from the query. |
| [a-m] | matches characters between and including 'a' and 'm'. |
| [d-p]{0, 4} | matches characters between and including 'd' and 'p' for zero to four consecutive appearances. |
| [l-o] * | matches characters between and including 'l' and 'o' for zero or more appearances. |
| ([klop]) | matches the characters 'k', 'l', 'o' and 'p'. The parenthesis (. . .) signals that the position of this match will be returned from the query. |

Figure 8:
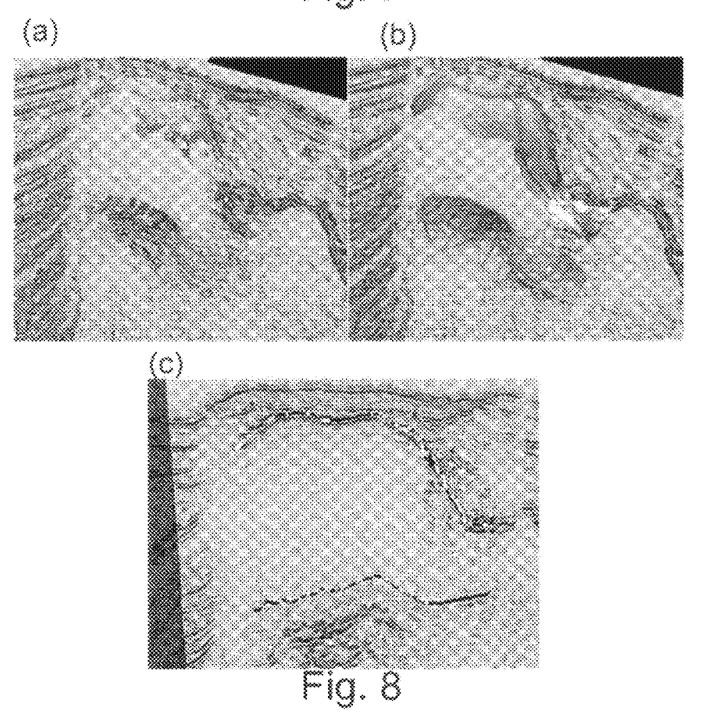
FIG. 8 shows (a) patches corresponding to top and base reflectors of the salt dome identified by a query string for the dome, (b) surfaces obtained by interpolating between these patches in the top and base reflectors, and (c) the surfaces overlaid on the seismic amplitude cross-section of FIG. 7.

The patches of the top and base reflectors identified by the search are shown in FIG. 8(a). FIG. 8(b) then shows the surfaces obtained by interpolating between these patches in the top and base reflectors. FIG. 8(c) shows the surfaces of FIG. 8(b) overlaid on the seismic amplitude cross-section of FIG. 7. White lines are the interpolated surfaces from the combined top and base search, while black lines are results from searching for the top and base individually. The query string was able to detect the top and base of the salt simultaneously, even though the number of extrema between the left and the right side of the detected surfaces exhibited great variation.

Example 4

This example illustrates a search on a combination of different attributes to extract structures of interest. The structure of interest in this example is the top of a salt surface. Two different attributes are used to characterise the surface: (i) the seismic amplitude and (ii) the number of neighbouring patches below each extrema surface. The results shows that the same method for searching that was used in the previous examples on one attribute can be extended to search over several attributes simultaneously. Furthermore, attribute (i) is an example of a seismic attribute and attribute (ii) is an example of a geometric attribute.

Figure 9:
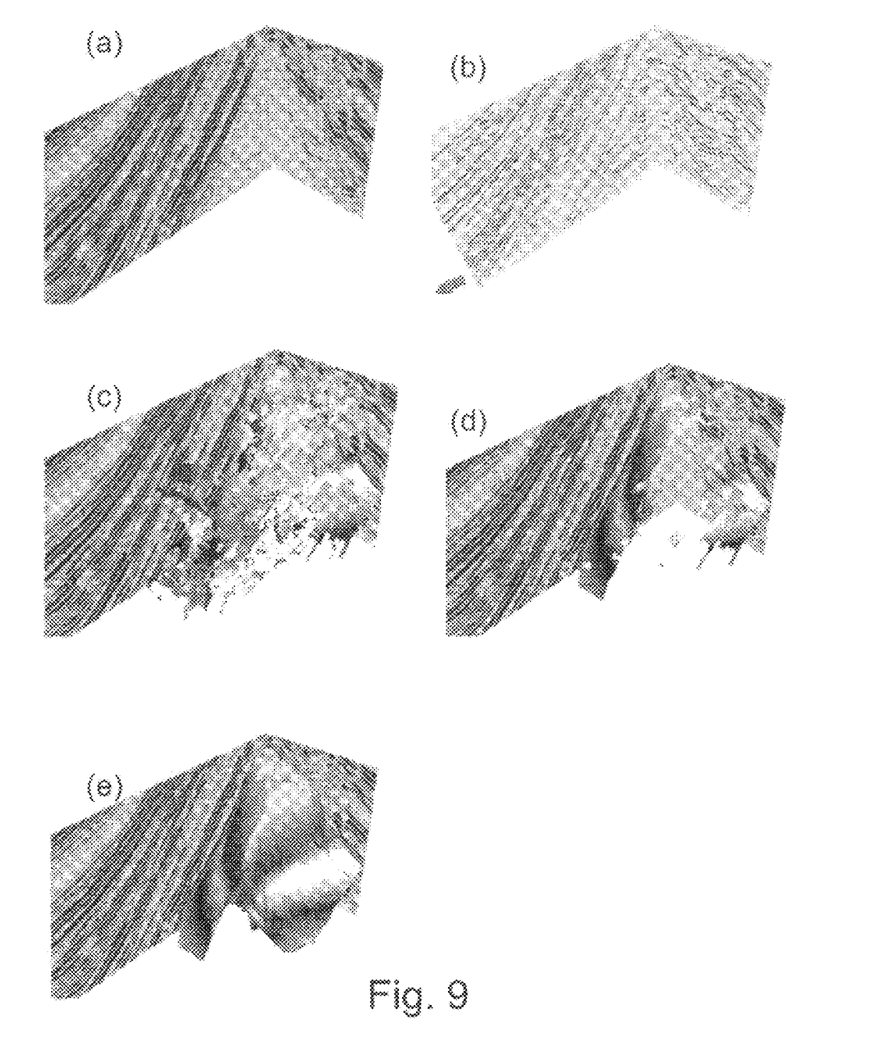
FIG. 9 shows (a) two orthogonal seismic amplitude cross-sections (b) two corresponding orthogonal cross-sections showing the number of neighbouring horizon patches below each patch on the cross-sections, (c) patches identified by a query string searching for both seismic amplitude and number of neighbouring horizon patches, (d) the remaining patches after the smallest patches are filtered out, and (e) the result of interpolating to close the spaces between the remaining patches.

FIGS. 9(a) and (b) show the same two orthogonal cross-sections, (a) showing the seismic amplitude on the cross-sections and (b) showing the number of neighbouring extrema patches below each patch on the cross-sections. The number of neighbouring extrema patches is an attribute that is calculated after the data points are combined into surface primitives (or extrema patches). Typically two neighbour number attributes are computed: one for the number of neighbouring patches above the patch in question, and one for the number of neighbouring patches below the patch in question. The attribute is the same for all data points belonging to the same patch. The attribute is a measure of the chaoticness above or below the patch in question. For example, a high number of neighbours below a patch indicates a chaotic region below, whereas a low number of neighbours below a patch indicates a stratified region below. The search was performed with a single query string which contains information from both attributes. FIG. 9(c) shows patches identified by the search. FIG. 9(d) shows the result of filtering out the smallest. FIG. 9(e) shows the result of interpolating to close the spaces between the remaining patches of FIG. 9(d).

Example 5

Another example of a geometric attribute is proximity of each data point to a fault. Such an attribute can be used to identify possible drilling hazards. In particular, the query string can correspond to a known drilling hazard pattern, which is typically a combination of one or more seismic signal attributes and one or more geometrical attributes.

Thus, an example of a drilling hazard pattern associated with tar in the overburden is: (i) a sequence of two extrema that correspond to rock and fluid (negative seismic amplitude followed by positive amplitude), (ii) a low dip (e.g. <5°) for the horizons of the extreme, and (iii) close proximity to a fault. A query string coding this hazard pattern is ([k-m][j-r][z])([q-p][j-q][z]). A detailed description of the query is given in Table 3.

TABLE 3

| Query part | Description |
| --- | --- |
| ([k-m][j-r][z]) | Matches three consecutive characters. The first character is the encoded seismic amplitude which should match as negative seismic amplitude of low strength [k-m]. The second character is the encoded dip which should match small dips of both signs [j-r]. The last character is the encoded fault proximity attribute which should match high positive values [z] which translates into a short distance to the fault. |
| ([q-p][j-q][z]) | Matches three consecutive characters. The first character is the encoded seismic amplitude which should match as positive seismic amplitude of medium strength [q-p]. The second character is the encoded dip which should match small dips of both signs [j-q]. The last character is the encoded fault proximity attribute which should match high positive values [z] which translates into a short distance to the fault. |

Figure 10:
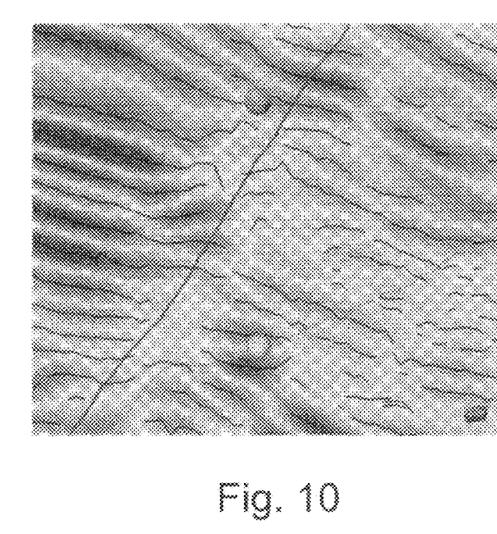
FIG. 10 shows a seismic amplitude cross-section in which seismic amplitude extrema, and associated horizon surfaces, run generally diagonally downwards from left to right and two faults cross the extrema running diagonally downwards from right to left.

FIG. 10 shows a seismic amplitude cross-section in which seismic amplitude extrema, and associated horizon surfaces, run generally diagonally downwards from left to right and two faults cross the extrema running diagonally downwards from right to left. Two data points on the cross-section matching the drilling hazard pattern associated with tar in the overburden are marked with respective circles.

Figure 11:
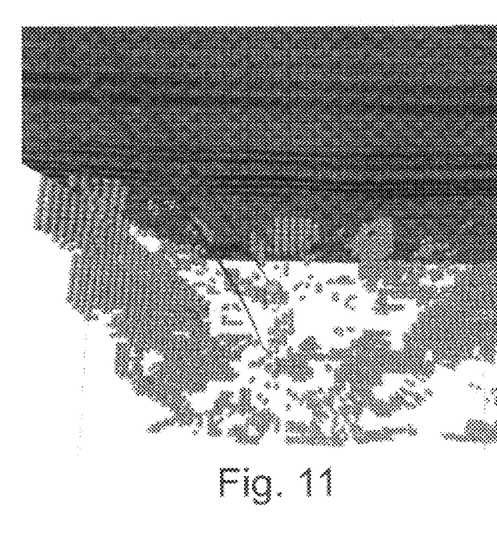
FIG. 11 shows the seismic volume from which the cross-section of FIG. 10 was obtained and two possible drilling trajectories, drilling hazards in the volume being indicated by spheres.

Data points in the seismic volume matching the drilling hazard pattern are shown by spheres in FIG. 11. Two possible drilling trajectories are also shown. One trajectory intersects the drilling hazards shown in FIG. 10, while the other trajectory avoids the hazards.

Example 6

Figure 12:
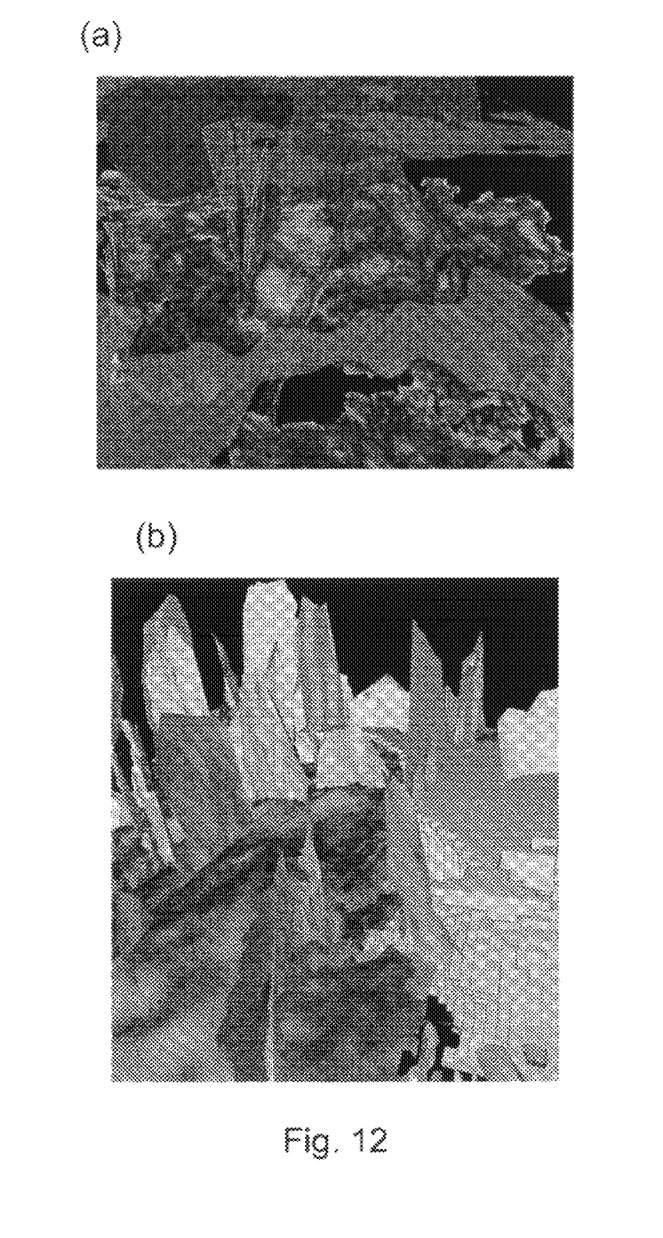
FIG. 12 shows (a) and (b) respective global representation of geological data-types, such as faults, horizons and geobodies, contained in a model repository, (c) identifying terminations in a model repository, and (d) accumulated gas and oil, and migration pathways within the model repository.

FIGS. 12(a) and (b) show respective global representations of geological data-types, such as faults, horizons and geobodies, contained in a model repository. In FIG. 12(b), the horizons are shown with the seismic amplitude overlaid on them. Using an appropriate query, the repository can be searched for identifying stratigraphic layer terminations in the geological formations as shown in FIG. 12(c) which is a representative cross-section through a global representation, such as those shown in FIGS. 12(a) and (b). Geological data are also processed using Schlumberger PetroMod™ petroleum systems modeling to provide migration pathways as shown on FIG. 12(d), in which distributions of accumulated gas and oil are the regions of solid (green and red) colour, and migration pathways for the hydrocarbons are the green lines.

Table 4 shows how the method can be used to detect target drilling signatures by building an adequate query within the model repository. In Table 4, Elements 1 to 4 are features which are necessary, but not sufficient, in defining a hydrocarbon play.

TABLE 4

| | Element 1 | Element 2 | Element 3 | Element 4 |
|---|---|---|---|---|
| Element description | Direct hydrocarbon indicator | Fluid interface | Hydrocarbon migration | Structural trap |
| Example | Bright spot | Flat spot | Pathway from source rock to this position | Anticline |
| Data source | Seismic volume | Stratigraphic surfaces | Petroleum system modeling result | Stratigraphic Surfaces |

Based on Table 4, the model builds a query string to identify possible target drilling locations. In particular, the query string can correspond to a known target drilling pattern, which is typically a combination of geological attributes as specified in Table 5. In Table 5, the translators are procedures (i.e. computer code) which translate numerical values (e.g. seismic attributes) into characters for incorporation into a character string at a data point, and the constraints describe what the query will search for.

TABLE 5

| Translator | Amplitude translator | Dip translator | Migration path translator | Anticline translator |
|---|---|---|---|---|
| Constraints | High amplitude | Low dip | Migration path exists | Anticline identified |

From the constraints of table 5, a query string is constructed. An example of such a query string is shown in Table 6. The query is performed over two adjacent data points (Point 1 and Point 2).

TABLE 6

| Query string: 'vtabcsaa' | | | | | | | | |
|---|---|---|---|---|---|---|---|---|
| Point | 1 | | | | 2 | | | |
| Value | 1.6 | 10.0 | 0 | 1 | −1.8 | 8.0 | 0 | 0 |
| Character | v | t | a | b | c | s | a | a |
| Attribute | Amp. | Dip | Migr. | Anti. | Amp. | Dip | Migr. | Anti. |

Figure 13:
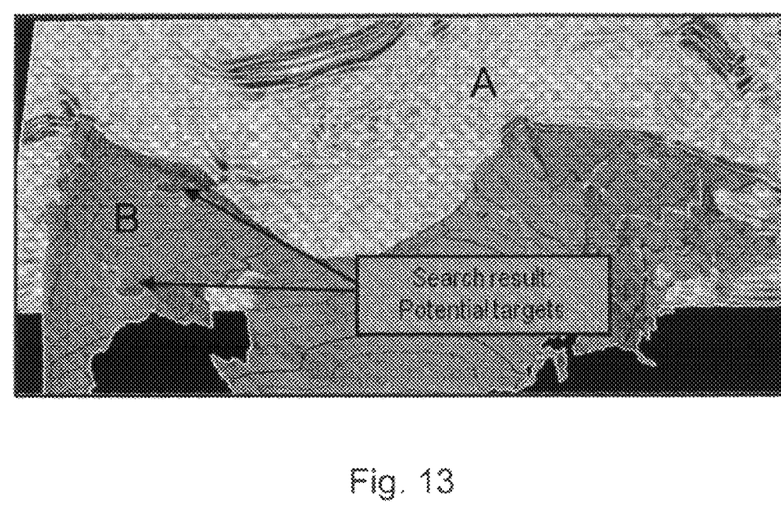
FIG. 13 shows target drilling locations identified in the model repository of FIG. 12(b).

FIG. 13 shows a result of the query for target drilling locations based using the query string detailed above in the model repository of FIGS. 12(a) and (b). The area A is a seismic amplitude cross-section, and the region B is a stratigraphic surface projecting from the cross-section. Locations in the stratigraphic surface matching the target drilling pattern are indicated.

Thus, using appropriate queries for target locations and for drilling hazards, possible drilling trajectories can be elaborated to optimize production from the geological formation.

All references referred to above are hereby incorporated by reference.

The invention claimed is:

1. One or more processors and a computer program product stored in one or more non-transitory computer readable mediums accessible to the one or more processors for performing a method for use in well drilling, the method comprising:
    performing a seismic survey which comprises imparting energy to the earth and receiving return energy at a plurality of receiver locations to obtain a seismic volume;
    generating data points distributed throughout the seismic volume, each data point being associated with respective geological attributes which comprise respective seismic attributes,
    converting the geological attributes of each data point into a respective character string based on a conversion scale in which attribute values are associated with defined characters, the character strings collectively providing a search string;
    compiling a query character string defining sought geological attributes of an arrangement of one or more data points using the defined characters;
    searching the search string for arrangements of the character strings having geological attributes matching the query character string;
    identifying data points that match the defined characters designated by the query character string to create a geobody; and
    displaying the created geobody.

2. The computer program product according to claim 1, wherein the coding step includes concatenating the character strings of the data points into a single search string, the searching step being performed on the search string.

3. The computer program product according to claim 1, wherein the method includes graphically displaying identified data points.

4. The computer program product according to claim 1, wherein the method includes interpolating data points between identified data points.

5. The computer program product according to claim 4, wherein the method includes graphically displaying interpolated data points.

6. The computer program product according to claim 3 or 5, wherein the graphically displayed data points are displayed as a geobody.

7. One or more processors and a computer program product stored in one or more non-transitory computer readable mediums accessible to the one or more processors for performing a method for use in well drilling, the method comprising:
    processing data points distributed throughout a geological volume, wherein the geological attributes for each data point are at least one of seismic attributes, geometric attributes and numerical modelling derived attributes and where for at least some of the data points the geological attributes comprise one or more seismic attributes, the processing including converting the geological attributes of each data point into a respective character string based on a conversion scale in which attribute values are associated with defined characters, the character strings collectively providing a search string;

compiling a query character string defining sought geological attributes of an arrangement of one or more data points using the defined characters;

searching the search string for arrangements of the character strings having geological attributes matching the query character string;

identifying data points that match the defined characters designated by the query character string; and designing a well trajectory that avoids the identified data point.

8. The computer program product according to claim 7, wherein the arrangement is a line of adjacent data points.

9. The computer program product according to claim 7, wherein the method includes graphically displaying identified data points.

10. The computer program product according to claim 7, wherein the method includes interpolating data points between identified matched data points.

11. The computer program product according to claim 10, wherein the method includes graphically displaying interpolated data points.

12. The computer program product according to claim 9 or 7, wherein the graphically displayed data points are displayed as geobody.

13. The computer program product according to claim 7, wherein the query character string additionally defines sought attributes corresponding to one or more drilling target signatures and the well trajectory is designed to follow the target drilling signatures.

14. The computer program product according to claim 7, wherein the method includes drilling the well having the designed trajectory.

15. One or more processors and a computer program product stored in one or more non-transitory computer readable mediums accessible to the one or more processors for performing a method for use in well drilling with advance identification of possible drilling hazards and/or target drilling locations, the method comprising:

providing a model repository of the subsurface, the model repository containing interpreted subsurface features having geological attributes at respective subsurface positions of the features;

compiling a drilling hazard signature and/or a drilling target signature based on the geological attributes;

searching the model repository to identify subsurface positions which have geological attributes matching the drilling hazard signature and/or the target drilling signature;

using the identified subsurface positions to design a well trajectory; and drilling a well having the designed trajectory.

16. The computer program product according to claim 15, wherein a drilling target signature is compiled based on the geological attributes, and the identified subsurface positions have geological attributes matching the target drilling signature.

* * * * *